United States Patent [19]

Klahn

[11] Patent Number: 4,982,763
[45] Date of Patent: Jan. 8, 1991

[54] PLUG RETAINER

[75] Inventor: Francis C. Klahn, Huddleston, Va.

[73] Assignee: The Babcock & Wilcox Company, New Orleans, La.

[21] Appl. No.: 340,114

[22] Filed: Apr. 13, 1989

[51] Int. Cl.$^5$ .......................... F16L 35/10; F16L 55/18
[52] U.S. Cl. .......................................... 138/89; 138/90; 411/55
[58] Field of Search ............... 138/89, 90, 92; 165/71, 165/76; 411/55, 44, 15; 220/235, 236, 241, 242

[56] References Cited

U.S. PATENT DOCUMENTS

| 73,439 | 1/1868 | Copeland | 138/89 |
|---|---|---|---|
| 1,772,063 | 8/1930 | Zifferer | 411/55 |
| 1,898,087 | 2/1933 | Fullman | 138/89 |
| 4,091,841 | 5/1978 | Beneker et al. | 138/89 |
| 4,438,784 | 3/1984 | Bobichon et al. | 138/92 |
| 4,518,292 | 5/1985 | Calandra | 411/55 |
| 4,579,491 | 4/1986 | Kull | 411/55 |
| 4,787,420 | 11/1988 | Wilhelm | 138/89 |

FOREIGN PATENT DOCUMENTS 379030  3/1940  Italy .......................... 411/55

Primary Examiner—James E. Bryant, III
Attorney, Agent, or Firm—Robert J. Edwards; D. Neil LaHaye

[57] ABSTRACT

A plug retainer for a tube plug. The plug head and inboard end of the plug are captured by a locking cup and cap screw. The locking cup is threadably engaged in the open end of the tube plug. The cap screw shank extends through a bore in the locking cup and is threadably engaged with the mandrel in the tube plug. Compression rings on the locking cup and cap screw seal the locking cup to the tube plug and the cap screw to the locking cup to prevent leakage. The locking cup is crimped on the cap screw by the use of flutes on the cap screw head.

3 Claims, 2 Drawing Sheets

PLUG RETAINER

BACKGROUND OF THE INVENTION

1. Field of the Invention

The present invention relates generally to tube plugs and more particularly to a retainer assembly for heat exchanger tube plugs.

2. General Background

In tube-type heat exchangers a primary coolant fluid flows through the tubes of the heat exchanger while a secondary coolant fluid flows around the outside and in contact with the tubes such that heat exchange takes place between the two fluids. A defective or corroded tube presents the possibility of a leak wherein the higher pressure primary coolant will exit the tube and mix with the secondary coolant. This results in reduced efficiency of the heat exchanger and also in radioactive contamination of the secondary coolant in a nuclear steam generator. The most cost effective solution to such a problem is to plug the heat exchange tube.

Several types of explosive and mechanical plugs are used in the industry. However, the present invention is aimed mainly at mechanical tube plugs such as that described in U.S. Pat. No. 4,390,042. Some of these types of plugs have been found to be susceptible to Primary Water Stress Corrosion Cracking (PWSCC). This can be a result of the Inconel 600 material either not having a high enough temperature during final mill anneal and then not responding to thermal treatment or the material not receiving the proper thermal treatment. This results in susceptibility to PWSCC at each end of the expanded region where the mandrel has been pulled into the tapered section of the plug to expand the ribs into the tube wall, regions of high tensile stress. The resulting crack propagation may result in loss of the plug nose with primary-secondary leakage, assuming the tube has a through-wall defect, or in loss of the plug head which could become a loose part in the reactor coolant system. There is also the potential of a plug part ejecting up into the U-bend of the steam generator tubing. The solution to prevent such plugs from causing damage to the reactor coolant system is removal of the plugs or installing a retainer in the plug which serves the dual purpose of retaining the cracked plug in position and preventing substantial leakage of primary coolant through the defective plug into the defective heat exchange tube (plugging the plug). Due to the extra time and equipment required for plug removal and the fact that some attempts at plug removal have resulted in separation of the plug threaded/open end from the plug body, installation of a retainer assembly into the existing plug appears to be the most efficient initial solution to the problem. Applicant is not aware of any prior art aimed at solution of the problem associated with this particular plug design since the problem has only recently been recognized.

SUMMARY OF THE INVENTION

The present invention solves the aforementioned problem in a straightforward manner. What is provided is a plug retainer which captures the plug head and also acts as a leak limiting plug if the inboard end of the plug should fail due to PWSCC. The two part plug retainer is formed from a locking cup which threads into the existing plug head and a cap screw which threads into the mandrel of the existing plug. The locking cup is crimped around the cap screw to prevent separation in the event of failure of the existing plug.

BRIEF DESCRIPTION OF THE DRAWINGS

For a further understanding of the nature and objects of the present invention reference should be had to the following description, taken in conjunction with the accompanying drawings, in which like parts are given like reference numerals and, wherein.

DETAILED DESCRIPTION OF THE PREFERRED EMBODIMENT

Figure 1:
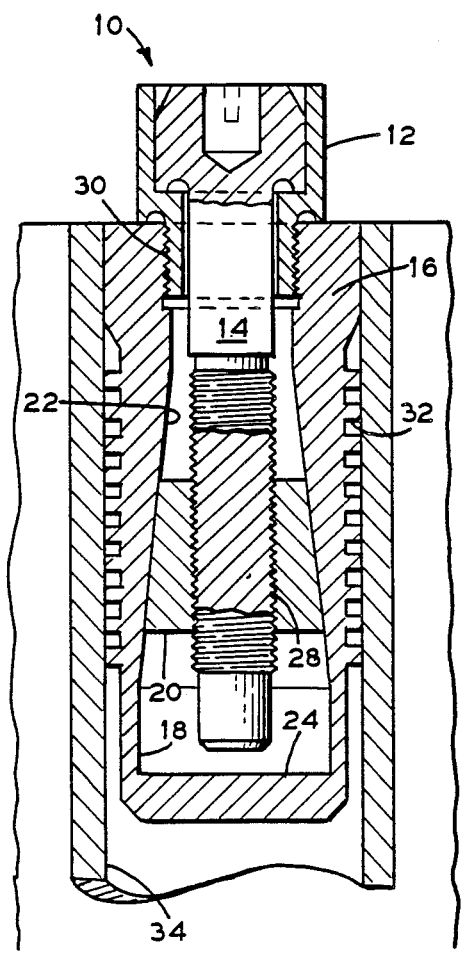
FIG. 1 is a cutaway view of the invention as it appears installed.

Referring to the drawings it is seen in FIG. 1 that the invention is generally referred to by the numeral 10. Plug retainer 10 is generally comprised of locking cup 12 and cap screw 14.

Plug retainer 10 is designed to be used in tube plug 16 which is generally comprised of shell 18 and mandrel 20. Shell 18 has a conical inner surface 22 which has a larger diameter at closed end 24 and a smaller diameter near open end 26. Conical inner surface 22 is arranged such that mandrel 20 is captured within shell 18 so that movement of mandrel 20 toward open end 26 causes shell 18 to expand outwardly without allowing mandrel 20 to be removed therefrom. Threads 28 on the inner surface of mandrel 20 and threads 30 near open end 26 are provided for ease of attachment of installation and removal tools not shown. Upon expansion of shell 18, ribs 32 on the outer edge of shell 18 are forced into gripping contact with the interior of heat exchange tube 34.

Figure 3:
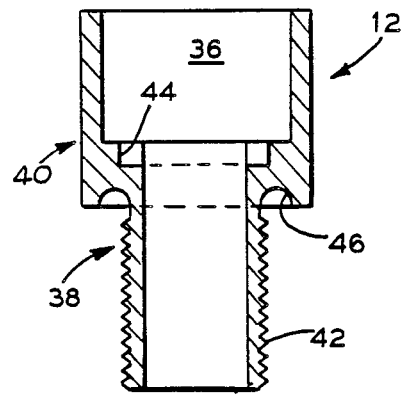
FIG. 3 is a view of the locking cup of the invention.

Locking cup 12, best seen in FIG. 3, is provided with longitudinal bore 36 therethrough to receive cap screw 14. Lower portion 38 is of lesser internal and external diameter than upper portion 40. The smaller diameter of bore 36 through lower portion 38 will be explained below. Lower portion 38 is also provided with external threads 42 which are sized to allow locking cup 12 to be threadably installed in tube plug 16. Threads 42 may also be provided with an integral thread flute to help clear any debris that may be present in threads 30 of tube plug 16. For ease of installation, slot 44 is provided in the bottom of upper portion 40. This permits installation with a screwdriver or similar tool to apply the proper torque to achieve sealing of locking cup 12 to the surface of tube plug 16.

Sealing means to insure proper sealing of locking cup 12 to the surface of tube plug 16 is provided in the form of first integral compression ring 46 on upper portion 40 at the junction of lower portion 38 and upper portion 40. Similar sealing means to insure proper sealing of cap screw 14 to locking cup 12 is provided in the form of second integral compression ring 48 on head 50 at the junction of head 50 and shank 52.

Figure 2:
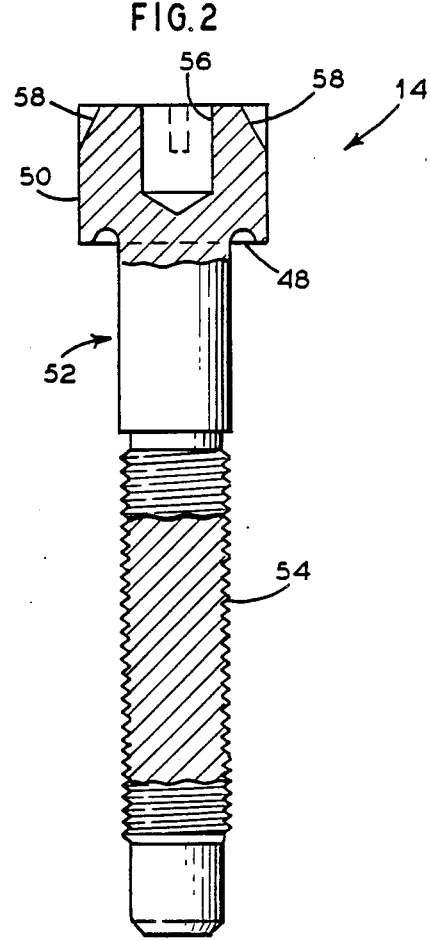
FIG. 2 is a view of the cap screw of the invention.

Cap screw 14, best seen in FIG. 2, has shank 52 sized to fit through lower portion 38 of locking cup 12. Head 50 is a larger diameter than shank 52 and is sized to fit within upper portion 40 of locking cup 12 but not within lower portion 38. Shank 52 is provided with threads 54 which are sized to allow threading of cap screw 14 through mandrel 20. As in locking cup 12, threads 54 may also be provided with an integral thread flute to help clear any debris that may be present in threads 28 of mandrel 20. Head 50 is provided with drive means in the form of drive socket 56 which may be sized to allow use of known drive means such as a ¼ inch drive tool for installation. Means for preventing accidental separation of locking cup 12 and cap screw 14 after installation is provided in the form of head flutes 58. This allows crimping of upper portion 40 of locking cup 12 onto head 50.

In operation, locking cup 12 is first threaded into the head of tube plug 16 and torqued to a predetermined value, which assures leak limiting performance while remaining within ASME Code alllowable limits. Cap screw 14 is then inserted through locking cup 12 and threaded into mandrel 20 and torqued to a similar predetermined value. Sealing is provided by compression rings 46, 48. In normal practice, threads 28 on mandrel 20 and threads 30 on the open threaded end of tube plug 16 are of a different pitch. Installation may be conducted either in a manual or robotic mode. Locking cup 12 and cap screw 14 are fabricated from high mill annealed Alloy 600 material per ASME SB-166 and thermally treated at 1325° F. for 10 hours to remove residual machining stresses and place the material in a microstructure proven to be resistant to PWSCC. Test results have shown that plug retainer 10 provides a leak limiting seal with leakage of less than 0.0001 gpm at 4400 psi pressure differential and 650° F. Such test results indicate that plug retainer 10 can meet both operating and faulted design loads. Plug retainer 10 fits within the existing inside diameter of heat exchange tube 34 and can accomodate either a recessed plug or a plug that is protruding below the face of the tubesheet. Calculations indicate that any coolant which may be trapped in tube plug 16 should not provide sufficient energy to eject closed end 24 with adequate velocity to penetrate the wall of heat exchange tube 34. Plug retainer 10 is capable of lasting for the expected design life of the steam generators when installed and is also capable of being removed without damage to tube plug 16 or heat exchange tube 34 by uncrimping locking cup 12 if there is a desire to remove tube plug 16 at a later date. There is also very little possibility of separation of plug retainer 10 as a unit from tube plug 16 since threads 28, 30 are each of a different pitch.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A plug retainer for retaining a tube plug in its installed position, the tube plug having an open threaded end and a threaded mandrel movably received inside the tube plug, said plug retainer comprising:
   a. a locking cup having a longitudinal bore therethrough and an externally threaded lower portion adapted to be threadably received in the open threaded end of the tube plug, said lower portion being of lesser internal and external diameter than the upper portion of said locking cup;
   b. a compression ring integral with the upper portion of said locking cup at the junction of said upper and lower portions;
   c. a cap screw having a threaded shank fitting through the lower portion of said locking cup and threadably receivable in the threaded mandrel of the tube plug and a head sized to be received within the upper portion of said locking cup; and
   d. a compression ring integral with the head of said cap screw at the junction of said head and shank.

2. The plug retainer of claim 1, wherein said cap screw is provided with head flutes on said cap screw head.

3. The plug retainer of claim 1, wherein said cap screw is provided with a drive socket.

* * * * *